(12) United States Patent
Peterson et al.

(10) Patent No.: US 10,684,722 B2
(45) Date of Patent: Jun. 16, 2020

(54) TOUCH INPUT SETTINGS MANAGEMENT

(71) Applicant: Lenovo (Singapore) Pte. Ltd., Singapore (SG)

(72) Inventors: Nathan J. Peterson, Oxford, NC (US); David Rivera, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 505 days.

(21) Appl. No.: 14/971,584

(22) Filed: Dec. 16, 2015

(65) Prior Publication Data

US 2016/0103553 A1    Apr. 14, 2016

Related U.S. Application Data

(63) Continuation of application No. 13/480,443, filed on May 24, 2012, now abandoned.

(51) Int. Cl.
    *G06F 3/041*    (2006.01)
    *G06F 3/0354*   (2013.01)

(52) U.S. Cl.
    CPC ........ *G06F 3/0416* (2013.01); *G06F 3/03545* (2013.01); *G06F 2203/04106* (2013.01)

(58) Field of Classification Search
    CPC ....... G06F 2203/04106; G06F 3/03545; G06F 3/0416
    See application file for complete search history.

(56) References Cited

U.S. PATENT DOCUMENTS

| | | | |
|---|---|---|---|
| 2002/0080123 A1* | 6/2002 | Kennedy | G06F 3/041 345/173 |
| 2005/0237310 A1 | 10/2005 | Fabritius et al. | |
| 2007/0242056 A1 | 10/2007 | Engelhardt et al. | |
| 2009/0077487 A1 | 3/2009 | Day et al. | |
| 2010/0083108 A1 | 4/2010 | Rider et al. | |
| 2010/0182247 A1* | 7/2010 | Petschnigg | G06F 1/1647 345/173 |
| 2010/0194693 A1 | 8/2010 | Selin et al. | |

(Continued)

OTHER PUBLICATIONS

Maskery, David, Combined Search and Examination Report for Application No. GB1304609.9, dated Sep. 30, 2013, 6 pages.

(Continued)

*Primary Examiner* — Insa Sadio
(74) *Attorney, Agent, or Firm* — Ference & Associates LLC

(57) ABSTRACT

In one aspect a method including: detecting an initial input indicating a user selection disabling finger/human body part touch input for a touch input device of an information handling device; providing a dialog box to a user offering an opportunity to provide an appropriate input confirming the initial input; responsive to expiration of a predetermined time, reverting back to a default mode wherein finger/human body part touch input is enabled, unless a confirming input is received within the predetermined time; and responsive to receiving a confirming input prior to the expiration of the predetermined time, selecting a pen only mode of input and disabling finger/human body part touch input on the touch input device of the information handling device. Other aspects are described and claimed.

18 Claims, 6 Drawing Sheets

(56) References Cited

U.S. PATENT DOCUMENTS

2011/0098019 A1    4/2011  Fujii
2011/0201301 A1*   8/2011  Okada .................. G06F 3/0416
                                                        455/404.1

OTHER PUBLICATIONS

Maskery, David, Examination Report for Application No. GB1304609.9, dated Jun. 4, 2014, 3 pages.

Dr. Windows: ClickOff—Dialogboxen automatisch schliessen, drwindows.de, Oct. 4, 2012, 2 pages. Available at: http://www.drwindows.de/automatisierung/37192-clickoff-windows-dialogboxen-automatisch-schliessen.html Last accessed Sep. 15, 2016.

* cited by examiner

TOUCH INPUT SETTINGS MANAGEMENT

CROSS-REFERENCE TO RELATED APPLICATIONS

This application is a continuation of U.S. application Ser. No. 13/480,443, filed May 24, 2012, the contents of which are incorporated by reference herein.

BACKGROUND

There are reasons why a user might want to disable the touch screen on an information handling device such as a tablet device, phone device, et cetera. For example, one of the reasons is, if the user has a pen or stylus for input (hereinafter simply "pen"), and the user is using a drawing application and the user's palm keeps touching the touch screen while he or she is trying to draw with a pen, inadvertent palm input may register on the device. The palm input can make it very difficult to reliably use the pen in a drawing application. There are existing arrangements for disabling inadvertent touch input.

BRIEF SUMMARY

In summary, one aspect provides a method comprising: detecting an initial input indicating a user selection disabling finger/human body part touch input for a touch input device of an information handling device; providing a dialog box to a user offering an opportunity to provide an appropriate input confirming the initial input; responsive to expiration of a predetermined time, reverting back to a default mode wherein finger/human body part touch input is enabled, unless a confirming input is received within the predetermined time; and responsive to receiving a confirming input prior to the expiration of the predetermined time, selecting a pen only mode of input and disabling finger/human body part touch input on the touch input device of the information handling device.

Another aspect provides an information handling device, comprising: one or more processors; a memory in communication with the one or more processors; and a touch screen; the memory storing program instructions that when executed by the one or more processors: detect an initial input indicating a user selection disabling finger/human body part touch input for the touch screen; provide a dialog box to a user offering an opportunity to provide an appropriate input confirming the initial input; responsive to expiration of a predetermined time, revert back to a default mode wherein finger/human body part touch input is enabled, unless a confirming input is received within the predetermined; and responsive to receiving a confirming input prior to the expiration of the predetermined time, select a pen only mode of input and disable finger/human body part touch input on the touch screen.

A further aspect provides a program product, comprising: a storage medium having program code embodied therewith, the program code comprising: program code configured to detect an initial input indicating a user selection disabling finger/human body part touch input for the touch screen; program code configured to provide a dialog box to a user offering an opportunity to provide an appropriate input confirming the initial input; program code configured to, responsive to expiration of a predetermined time, revert back to a default mode wherein finger/human body part touch input is enabled, unless a confirming input is received within the predetermined time period; and program code configured to, responsive to receiving a confirming input prior to the expiration of the predetermined time, select a pen only mode of input and disable finger/human body part touch input on the touch screen.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
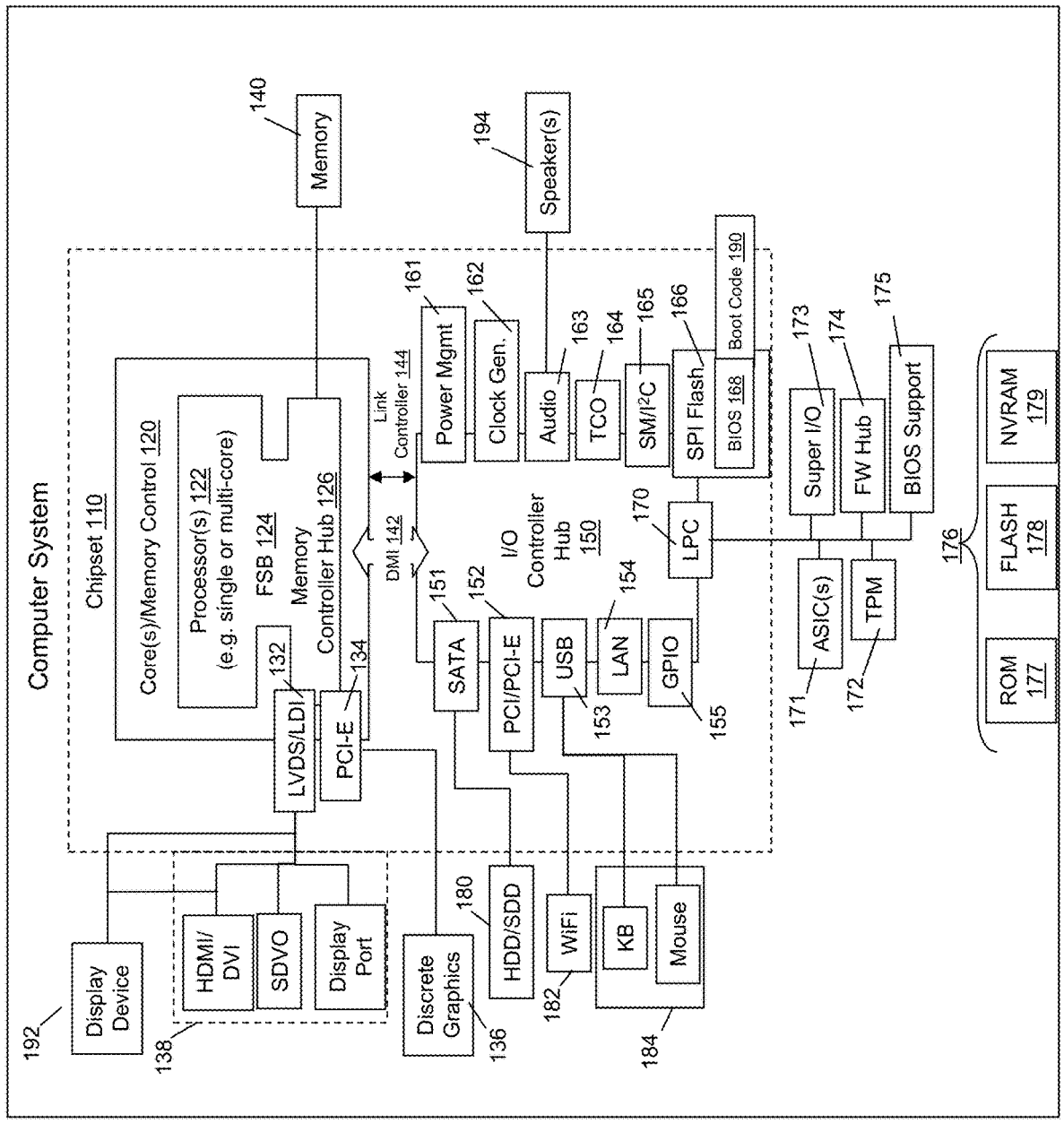
FIG. 1 illustrates an example information handling device.

It will be readily understood that the components of the embodiments, as generally described and illustrated in the figures herein, may be arranged and designed in a wide variety of different configurations in addition to the described example embodiments. Thus the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In operating a touch screen, users often inadvertently supply touch input which registers on the touch screen as if it were valid, intentional input. For example, if a user has a pen for input, and the user is using a drawing application and the user's palm keeps touching the screen while he or she is trying to draw with the pen, inadvertent palm input may register on the device. The palm input can make it very difficult to reliably use the pen in a drawing application.

There are arrangements for disabling or otherwise preventing inadvertent touch input. For example, a user can provide input to a device that is able to distinguish between pen input and finger/human body part touch input (hereinafter simply "touch input) and indicate that touch input should be disabled/ignored, for example by deactivating an appropriate layer in the touch screen or simply discounting/ignoring input from the appropriate layer, et cetera. Users provide such input using a mouse or other apparatus to disable the touch screen.

A problem, however, is that if the user disables touch input on a touch system and they do not have a pen or stylus available for re-enabling touch input (for example, if the touch input disable command was inadvertently issued), then the user will have a hard time re-enabling touch input. This is especially problematic in the domain of table computing devices.

Accordingly, an embodiment allows a user to reliably disable the touch input on a system with a pen, but only if the user has a pen. This ensures that the user disabling the touch is equipped to re-enable the touch input, that is, by ensuring the user has the pen prior to allowing disable of touch input.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
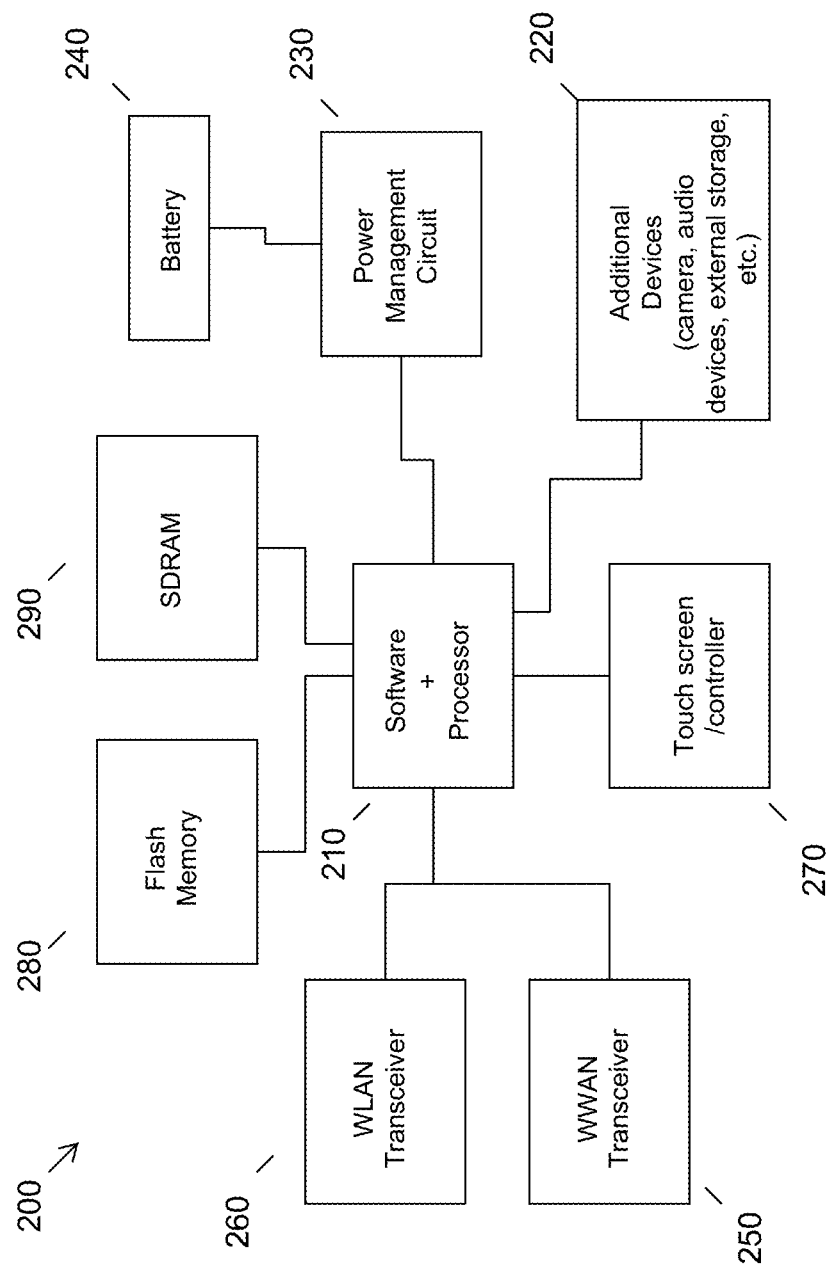
FIG. 2 illustrates another example information handling device.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

Figure 3:
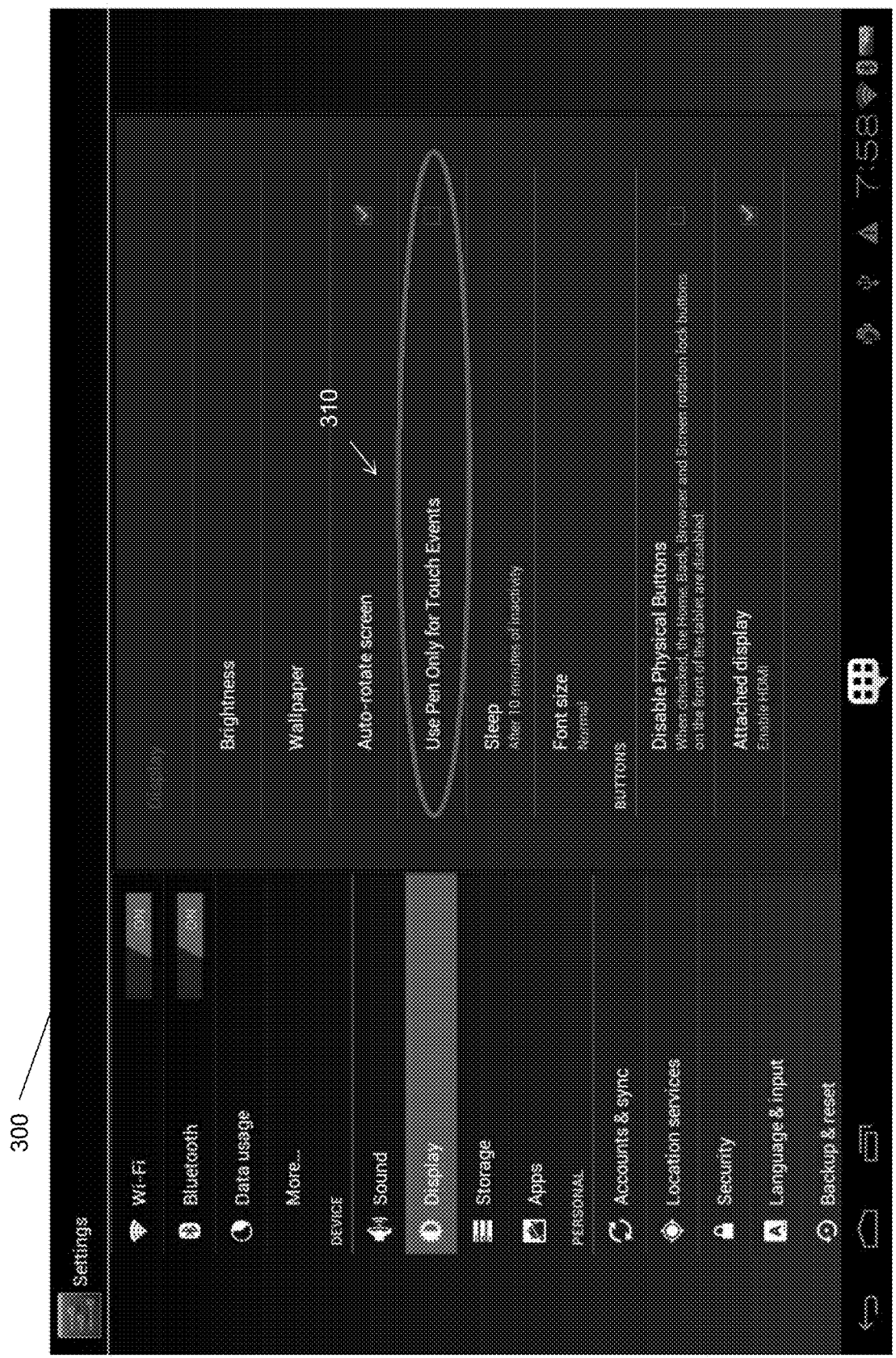
FIG. 3 illustrates an example settings management interface.

Referring to FIG. 3, in operating a touch screen, users often inadvertently supply touch input which registers on the touch screen as if valid, intentional input. For example, a user attempting to use a pen in a drawing application may inadvertently supply touch input, as for example via inadvertent contact of the palm or other part or the hand with the touch screen. To avoid such artifacts, an embodiment permits users to select a pen only mode of input.

Figure 4:
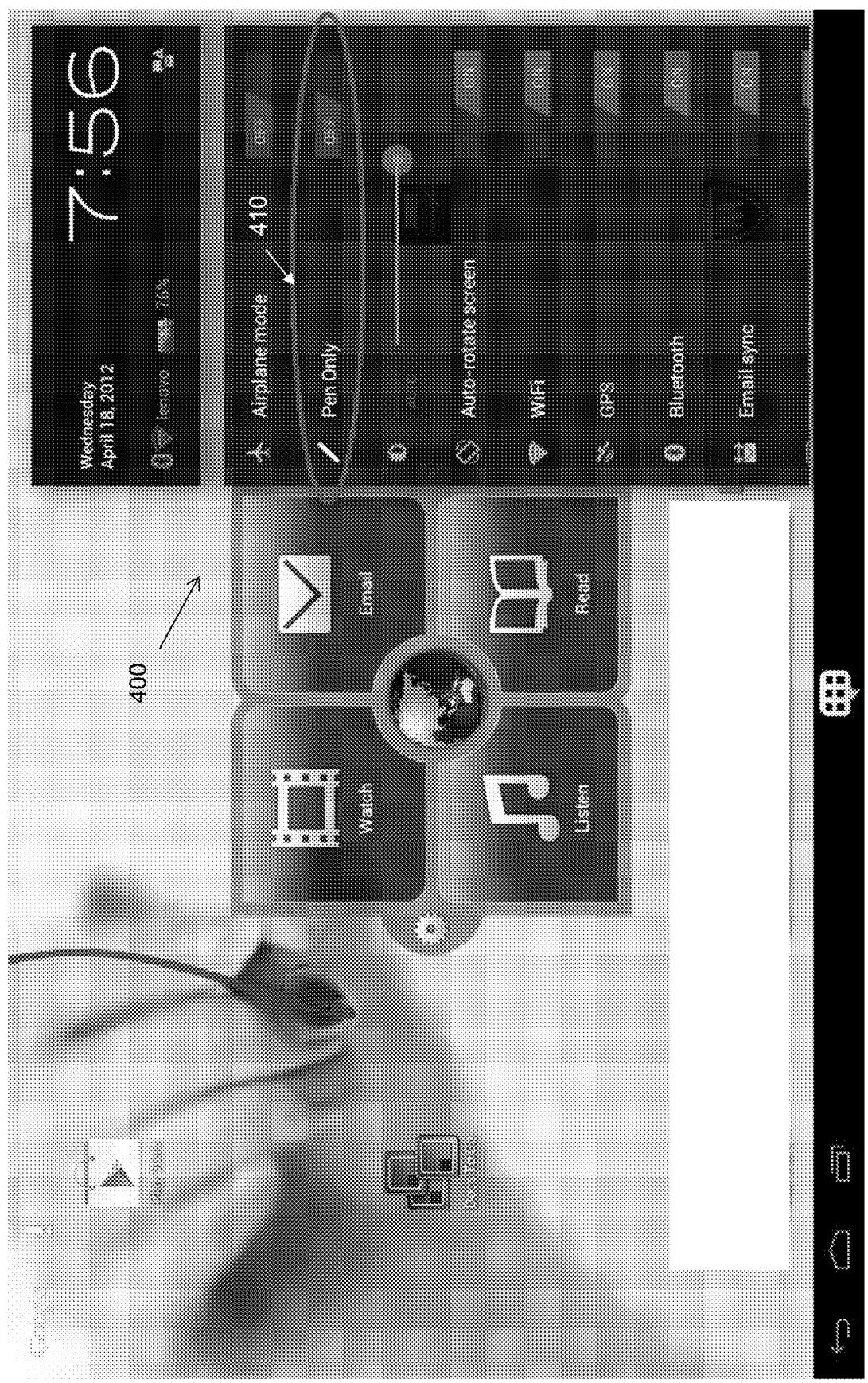
FIG. 4 illustrates another example settings management interface.

As illustrated in FIG. 3, within a settings screen 300 (or otherwise), an embodiment provides an option to disable touch events/input (that is, non-pen input). In a display settings submenu, for example, a user clicks to "Use Pen Only for Touch Events" 310. Alternatively, as another example and as illustrated in FIG. 4, a "Pen Only" option 410 may be selected from a settings area 400 of a tablet's home screen.

Figure 5:
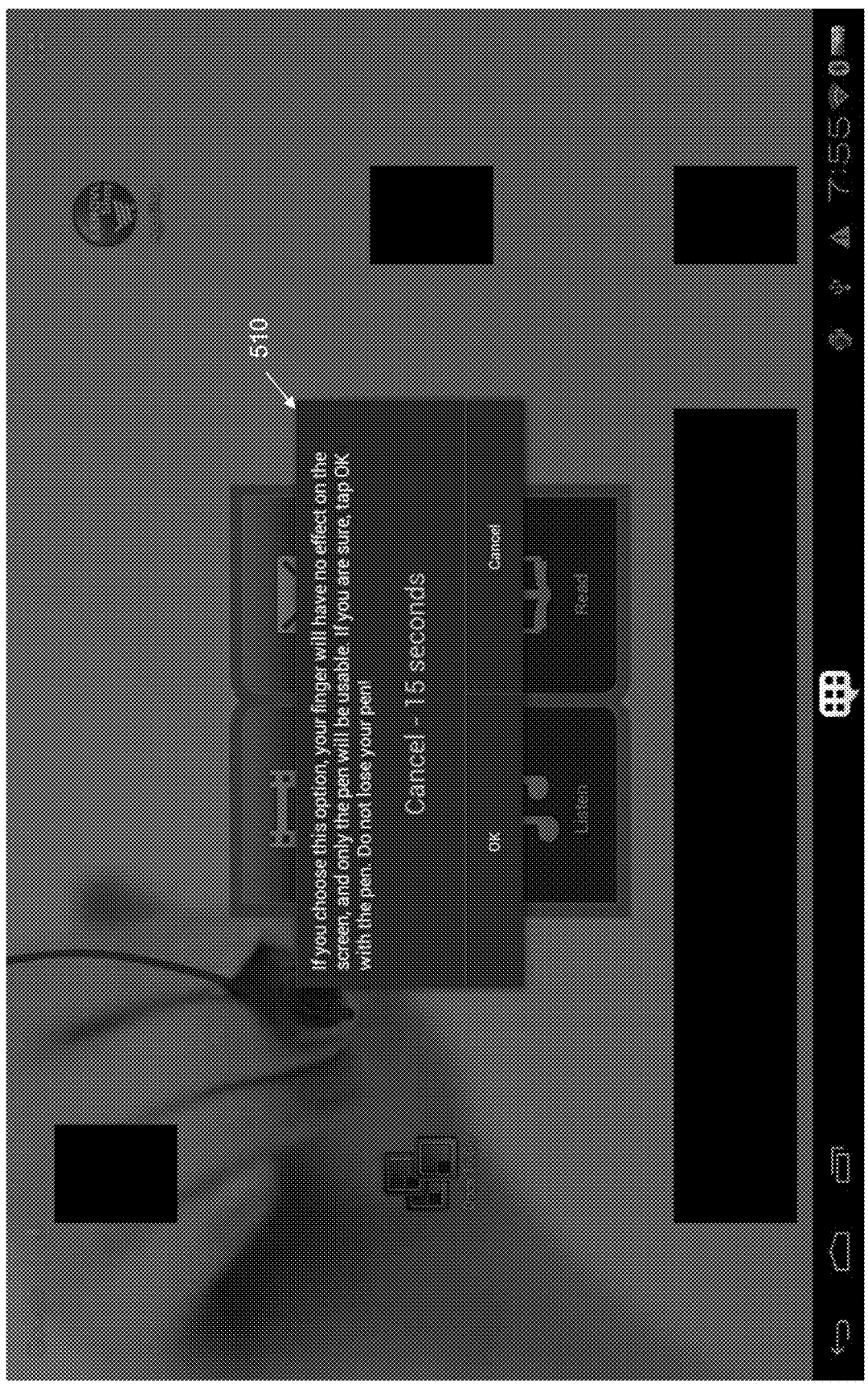
FIG. 5 illustrates an example dialog confirmation interface.

In response to a user selecting the "Use Pen Only for Touch Events" 310 or the "Pen Only" option 410, a pop-up dialogue 510, illustrated in FIG. 5, asks the user to confirm the choice, and may include a warning or other information regarding the choice. As a default, the choice can be cancelled unless an affirmation input is received in response to the dialogue 510 within a predetermined time, for example 15 seconds.

An embodiment also may require that a pen be used in order to permit a user opt in to a settings configuration whereby only pen input is permissible. For example, in the pop up dialogue 510, when the user is asked to click "OK" to confirm that the pen only option is desirable, the "OK" input may only register if provided with a pen. This is a way to ensure that the user uses the pen to confirm only pen input is allowed. Thus, while the confirmation dialogue 510 is shown, an embodiment disables touch input on the screen temporarily, but an embodiment may require an "OK" button input via a pen input to confirm this choice, otherwise the default of touch input enabled may be maintained/restored. In one embodiment, this is a way that only a pen can actually click "OK" and disable touch input. If the user does not click "OK" with a pen, then the dialogue 510 can time out and touch input will not be disabled on the device.

Figure 6:
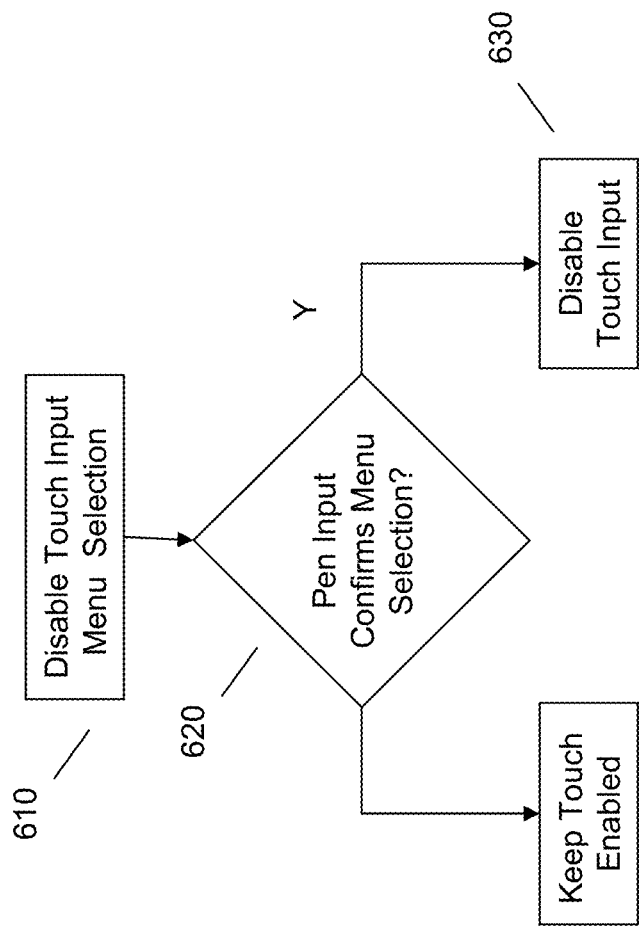
FIG. 6 illustrates an example method for touch input settings management.

Accordingly, referring to FIG. 6, an embodiment permits selection (via a variety of selection input methods, including for example touch input, pen input, et cetera) of a disable touch input selection 610. At 620, if the disable touch input menu selection is confirmed via a pen input, such as via a user providing a pen input to a dialogue box 510 as described herein, an embodiment disables touch input 630. Otherwise, touch input may remain enabled. Accordingly, an embodiment allows a user having a pen to easily to restrict the device to accept only pen input, for example via a layered touch screen as described herein, without risking a user lacking a pen inadvertently disabling touch input. Naturally, a substantial reverse of the inputs shown in FIG. 6, for example input by a user with a pen, may reverse and thus re-enable the touch input sensitivity of the touch input device.

Embodments may be implemented in one or more information handling devices configured appropriately to execute program instructions consistent with the functionality of the embodiments as described herein. In this regard, FIG. 1 and FIG. 2 illustrate non-limiting examples of such devices and components thereof. While mobile computing systems such as tablet computers, laptop computers, and smart phones have been specifically mentioned as examples herein, embodiments may be implemented using other systems or devices, such as e-readers, navigation systems, kiosks, and the like.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied thereon.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:

detecting an initial input indicating a user selection disabling finger/human body part touch input for a touch input device of an information handling device;

providing a dialog box to a user offering an opportunity to provide an appropriate input confirming the initial input, wherein the confirming input is required to be pen input;

temporarily disabling, during a duration of the dialog box, finger/human body part touch input on the touch input device;

responsive to expiration of a predetermined time, reverting back to a default mode wherein finger/human body part touch input is enabled, unless a confirming input is received within the predetermined time; and responsive to receiving a confirming input prior to the expiration of the predetermined time, selecting a pen only mode of input and disabling finger/human body part touch input on the touch input device of the information handling device.

2. The method of claim 1, wherein responsive to receiving pen input as confirming input, a layer of the touch input device responsive to human touch is disabled.

3. The method of claim 1, further comprising, responsive to receiving a reverse input enabling finger/human body part touch input, re-enabling finger/human body part touch input on the touch input device.

4. The method of claim 3, wherein the reverse input is provided with a pen.

5. The method of claim 1, wherein the information handling device is a table computing device.

6. The method of claim 1, wherein the information handling device is a laptop computing device.

7. The method of claim 1, wherein the information handling device is an e-reader.

8. The method of claim 1, wherein the information handling device is a smart phone.

9. An information handling device, comprising:
one or more processors;
a memory in communication with the one or more processors; and
a touch screen;
the memory storing program instructions that when executed by the one or more processors:
detect an initial input indicating a user selection disabling finger/human body part touch input for the touch screen;
provide a dialog box to a user offering an opportunity to provide an appropriate input confirming the initial input, wherein the confirming input is required to be pen input;
temporarily disable, during a duration of the dialog box, finger/human body part touch input on the touch input device;
responsive to expiration of a predetermined time, revert back to a default mode wherein finger/human body part touch input is enabled, unless a confirming input is received within the predetermined; and
responsive to receiving a confirming input prior to the expiration of the predetermined time, select a pen only mode of input and disable finger/human body part touch input on the touch screen.

10. The information handling device of claim 9, wherein the confirming input is required to be pen input.

11. The information handling device of claim 10, wherein responsive to receiving pen input as confirming input, a layer of the touch screen responsive to human touch is disabled.

12. The information handling device of claim 10, further comprising, responsive to receiving a reverse input enabling finger/human body part touch input, re-enabling finger/human body part touch input on the touch screen.

13. The information handling device of claim 12, wherein the reverse input is provided with a pen.

14. The information handling device of claim 9, wherein the information handling device is a table computing device.

15. The information handling device of claim 9, wherein the information handling device is a laptop computing device.

16. The information handling device of claim 9, wherein the information handling device is an e-reader.

17. The information handling device of claim 9, wherein the information handling device is a smart phone.

18. A program product, comprising:
a non-signal storage medium having program code embodied therewith, the program code comprising:
program code configured to detect an initial input indicating a user selection disabling finger/human body part touch input for the touch screen;
program code configured to provide a dialog box to a user offering an opportunity to provide an appropriate input confirming the initial input, wherein the confirming input is required to be pen input;
program code configured to temporarily disable, during a duration of the dialog box, finger/human body part touch input on the touch input device;
program code configured to, responsive to expiration of a predetermined time, revert back to a default mode wherein finger/human body part touch input is enabled, unless a confirming input is received within the predetermined time period; and
program code configured to, responsive to receiving a confirming input prior to the expiration of the predetermined time, select a pen only mode of input and disable finger/human body part touch input on the touch screen.

* * * * *